(12) United States Patent
Ogatsu et al.

(10) Patent No.: US 10,097,731 B2
(45) Date of Patent: Oct. 9, 2018

(54) CHANGE DEGREE DERIVING DEVICE, CHANGE DEGREE DERIVING SYSTEM AND KNOWN COLOR BODY

(71) Applicant: FUJI XEROX CO., LTD., Tokyo (JP)

(72) Inventors: Hitoshi Ogatsu, Kanagawa (JP); Shinji Sasahara, Kanagawa (JP); Junichi Matsunoshita, Kanagawa (JP); Ken Ogino, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 6 days.

(21) Appl. No.: 15/356,341

(22) Filed: Nov. 18, 2016

(65) Prior Publication Data
US 2017/0318192 A1 Nov. 2, 2017

(30) Foreign Application Priority Data
May 2, 2016 (JP) ................................. 2016-092707

(51) Int. Cl.
*G06K 9/00* (2006.01)
*H04N 1/60* (2006.01)
*G06K 9/62* (2006.01)
*H04N 9/04* (2006.01)

(52) U.S. Cl.
CPC ......... *H04N 1/6008* (2013.01); *G06K 9/6202* (2013.01); *H04N 1/603* (2013.01); *H04N 1/6047* (2013.01); *H04N 9/04* (2013.01)

(58) Field of Classification Search
CPC ...... H04N 1/6008; H04N 1/6027; H04N 1/60; H04N 9/045; H04N 9/04; G06T 5/001; G06T 5/40; G06K 9/6202
See application file for complete search history.

(56) References Cited

U.S. PATENT DOCUMENTS

| | | | |
|---|---|---|---|
| 2005/0078140 A1* | 4/2005 | Ono | B41J 29/393 347/19 |
| 2011/0217052 A1* | 9/2011 | Usui | G03G 15/00 399/15 |
| 2012/0236308 A1* | 9/2012 | Satoh | G01J 3/0248 356/402 |
| 2013/0027721 A1* | 1/2013 | Kobayashi | H04N 1/6033 358/1.9 |
| 2017/0310854 A1* | 10/2017 | Yamaguchi | H04N 1/00323 |
| 2017/0318192 A1* | 11/2017 | Ogatsu | G06K 9/6202 |

FOREIGN PATENT DOCUMENTS

JP    2014-196926 A    10/2014

\* cited by examiner

*Primary Examiner* — Amir Alavi
(74) *Attorney, Agent, or Firm* — Oliff PLC

(57) ABSTRACT

Provided is a change degree deriving device including a receiving unit that receives an image obtained by capturing an object and a known color body including plural color samples, the plural color samples including deterioration-series colors among colors used for the object, and each of the color samples having a known colorimetric value, a conversion rule generating unit that generates a conversion rule used to convert a color of the image received by the receiving unit into a colorimetric value in a device-independent color space based on the color samples included in the image received by the receiving unit, and a converting unit that converts a color of the object included in the image received by the receiving unit into a colorimetric value in the device-independent color space according to the conversion rule.

4 Claims, 4 Drawing Sheets

CHANGE DEGREE DERIVING DEVICE, CHANGE DEGREE DERIVING SYSTEM AND KNOWN COLOR BODY

CROSS-REFERENCE TO RELATED APPLICATIONS

This application is based on and claims priority under 35 USC 119 from Japanese Patent Application No. 2016-092707 filed May 2, 2016.

BACKGROUND

Technical Field

The present invention relates to a change degree deriving device, a change degree deriving system and a known color body.

SUMMARY

According to an aspect of the invention, there is provided a change degree deriving device including:

a receiving unit that receives an image obtained by capturing an object and a known color body including plural color samples, the plural color samples including deterioration-series colors among colors used for the object, and each of the color samples having a known colorimetric value;

a conversion rule generating unit that generates a conversion rule used to convert a color of the image received by the receiving unit into a colorimetric value in a device-independent color space based on the color samples included in the image received by the receiving unit; and a converting unit that converts a color of the object included in the image received by the receiving unit into a colorimetric value in the device-independent color space according to the conversion rule.

BRIEF DESCRIPTION OF THE DRAWINGS

Exemplary embodiments of the present invention will be described in detail based on the following figures, wherein.

DETAILED DESCRIPTION

Hereinafter, an exemplary embodiment of the present invention will be described in detail with reference to drawings.

Figure 1:
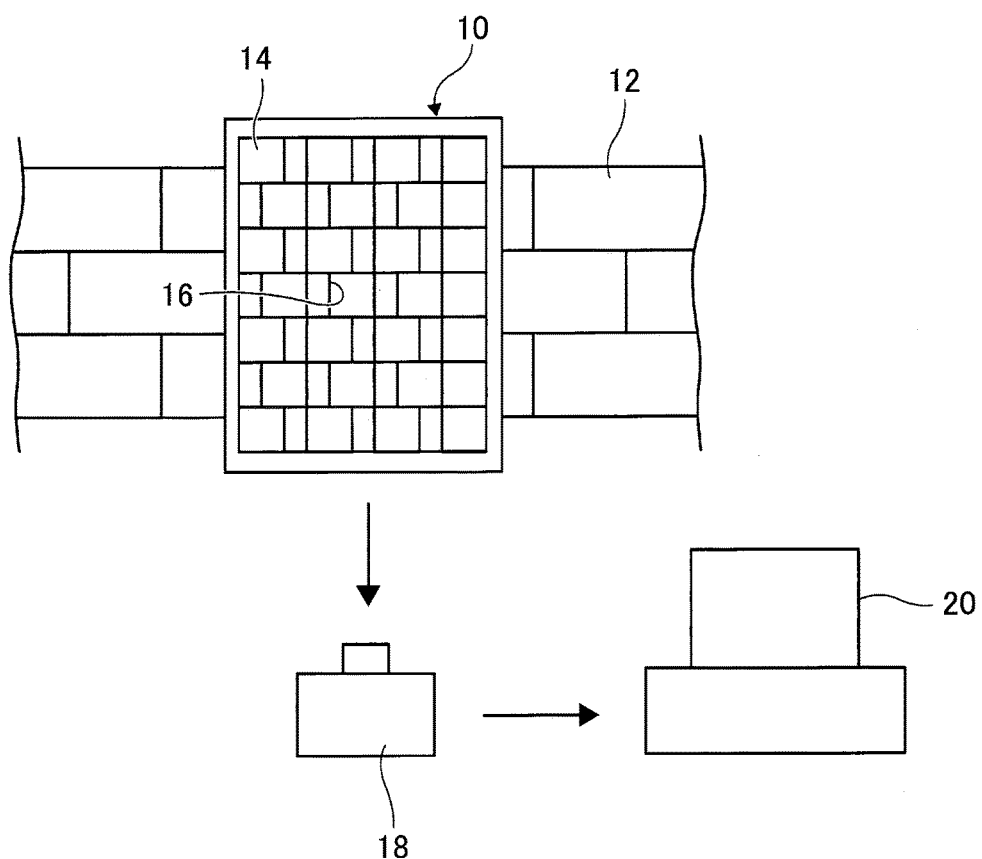
FIG. 1 is a diagram illustrating a deterioration measuring system according to an exemplary embodiment of the present invention.

FIG. 1 is a diagram illustrating a change degree derivation according to an exemplary embodiment of the present invention. Hereinafter, descriptions will be made assuming that a deterioration of an object is measured, and the change degree derivation is replaced by a "deterioration measurement" in the description.

A known color body 10 is fixed to an object 12 that is, for example, a wall face of a structure through pasting or the like. The known color body 10 includes plural color samples 14. Also, an object capturing hole 16 is formed at the center of the known color body 10.

An image capturing device 18 is a digital camera, a smartphone, a tablet PC, or the like, and captures the known color body 10. Since the object capturing hole 16 is formed in the known color body 10, the image capturing device 18 captures the wall face 12 through the object capturing hole 16, together with the known color body 10.

Well, in order to accurately measure the colors of an object, the object may be directly measured by a spectral colorimeter. However, a colorimeter is generally expensive, and is not expected to be possessed by anyone except for specific industries. Under such a situation, the present invention has been devised to provide a method capable of accurately measuring colors without new equipment investment or with inexpensive investment.

A deterioration measuring device 20, which is, for example, a personal computer, is configured to receive image data obtained by capturing the known color body 10 using the image capturing device 18, and process the image data.

Figure 2:
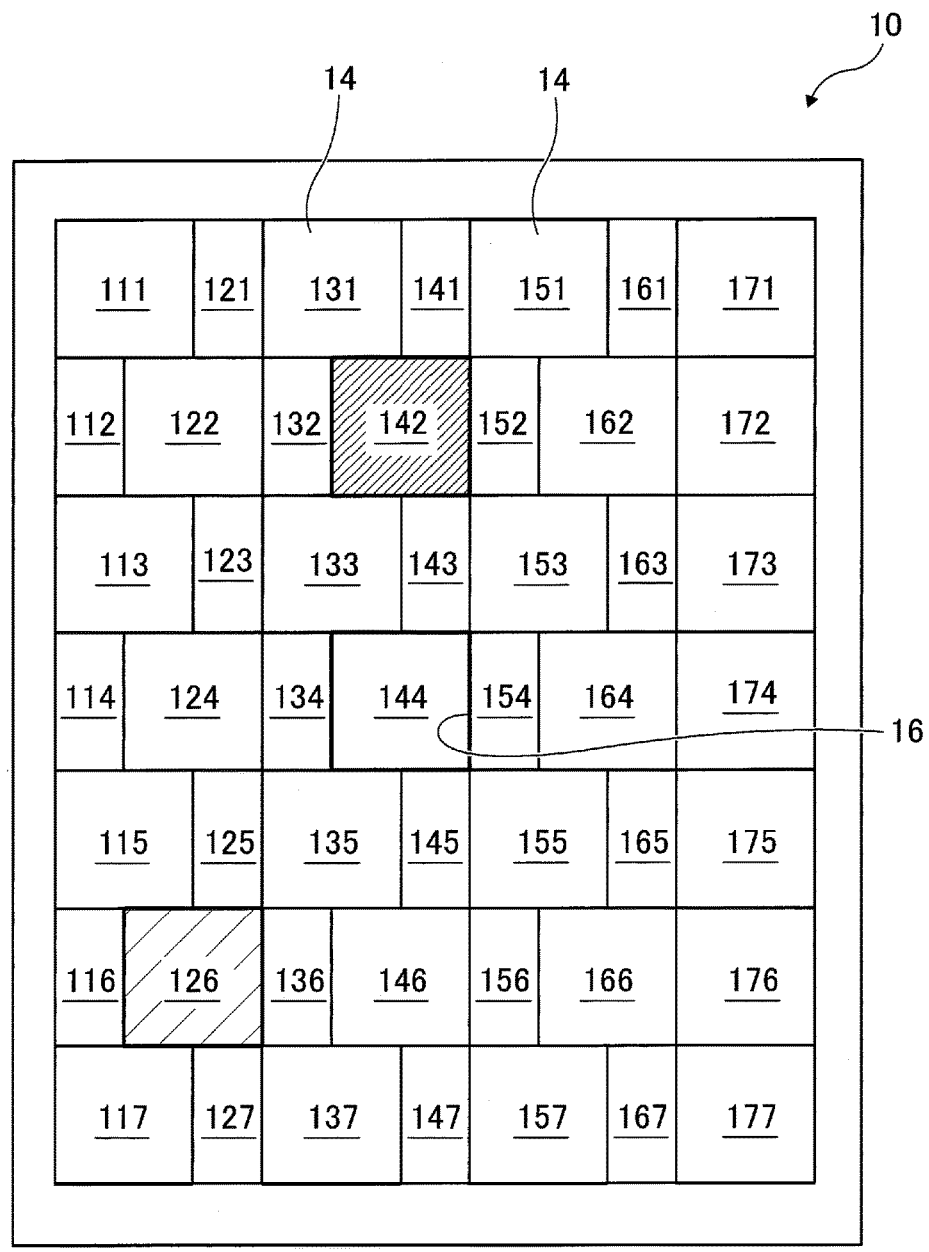
FIG. 2 is a plan view illustrating a known color body used in the exemplary embodiment of the present invention.

FIG. 2 illustrates details of the known color body 10.

On the known color body 10, plural color samples (patches) 14 as denoted by, for example, Nos. 111 to 177 are regularly arranged at predetermined positions. The color samples Nos. 111 to 177 include square color samples Nos. 111, 113, 115 . . . and rectangular color samples Nos. 112, 114, 116 . . . . The square color samples Nos. 111, 113, 115 . . . may include 100% solids of R (red), G (green), B (blue), C (cyan), M (magenta), Y (yellow), W (white), Bk (black) and their intermediate colors.

Also, the square color samples Nos. 111, 113, 115 . . . include plural deterioration-series color samples. The deterioration-series refer to a series of a gradually deteriorated color in an object to be measured. Here, the color sample No. 142 has a color of the object in a new product state, and the color sample No. 126 has a color in a deteriorated state. The deterioration-series color samples Nos. 142 and 126 are arranged around the object capturing hole 16, inside peripheral edges. That is, these are placed in an environment close to the object in the vicinity of the object capturing hole 16. In the example, the number of deterioration-series color samples is two (2), but the number of deterioration-series color samples, that is, a step size of a deterioration-series in a color space (which is also a locus of a color change caused by deterioration) is preferably as small as possible.

The rectangular color samples Nos. 112, 114, 116 . . . are white. The reason why the plural white color samples are arranged as described above is to easily check the occurrence of an illuminance ununiformity such as shadows. FIG. 1 is a diagram illustrating a change degree derivation according to the exemplary embodiment of the present invention. Hereinafter, descriptions will be made assuming that a deterioration of an object is measured, and the change degree derivation is replaced by a "deterioration measurement" in the description.

The object capturing hole 16 is formed in the same shape as that of the square color samples Nos. 111, 113, and 115 . . . .

The above described color samples Nos. 111 to 177 are color-measured as L*a*b* values in advance. Meanwhile, hereinafter, L*a*b* will be abbreviated as Lab. The Lab is a device-independent uniform color space. The Lab values obtained by color-measuring as described above are stored in a memory 24 of the deterioration measuring device 20 to be described below in a state of being paired with positions of the color samples Nos. 111 to 177.

Meanwhile, the object capturing hole 16 (denoted by No. 144 in FIG. 2) is unknown data, and thus, is not color-measured, and there is no object to be stored as colorimetric data.

Figure 3:
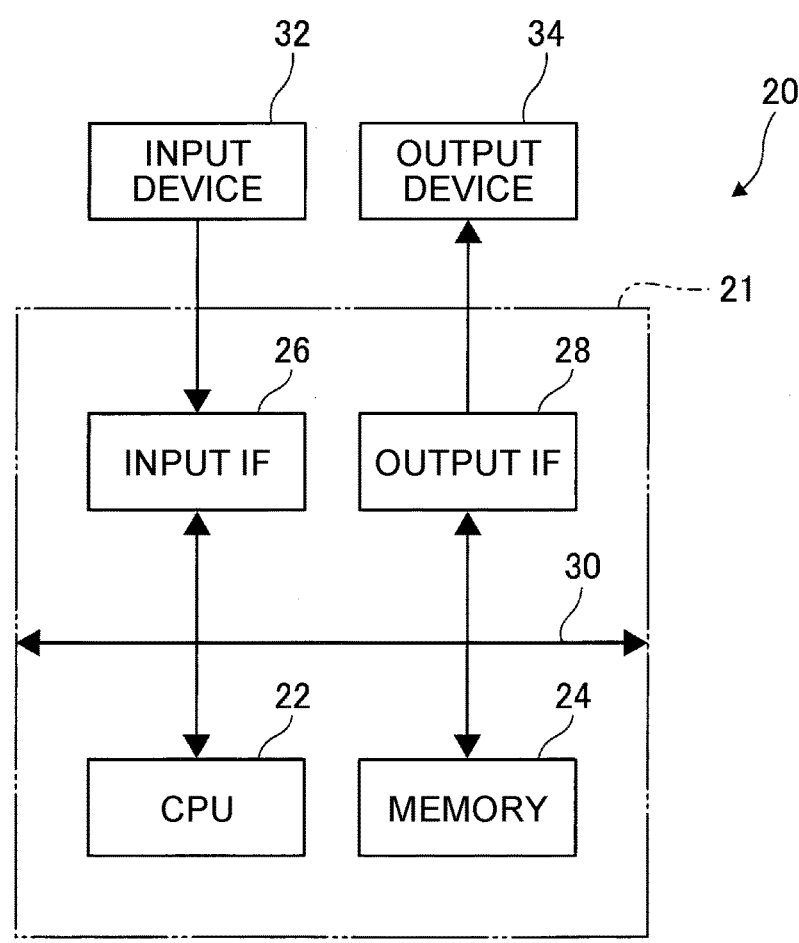
FIG. 3 is a block diagram illustrating hardware of a deterioration measuring device according to the exemplary embodiment of the present invention.

FIG. 3 is a block diagram illustrating the deterioration measuring device 20.

The deterioration measuring device 20 includes a data processor 21. The data processor 21 includes a CPU 22, the memory 24, an input interface 26, and an output interface 28, which are connected through a control bus 30.

The CPU 22 executes a predetermined processing based on a control program stored in the memory 24. An input device 32 is connected to the input interface 26. The input device 32 may include a connector that is directly connected to the above described image capturing device 18 to be used for input, or a device to be used for wireless input through a communication. Also, an output device 34 is connected to the output interface 28. The output device 34 is a display or a printer, through which a result such as processed data is output.

Figure 4:
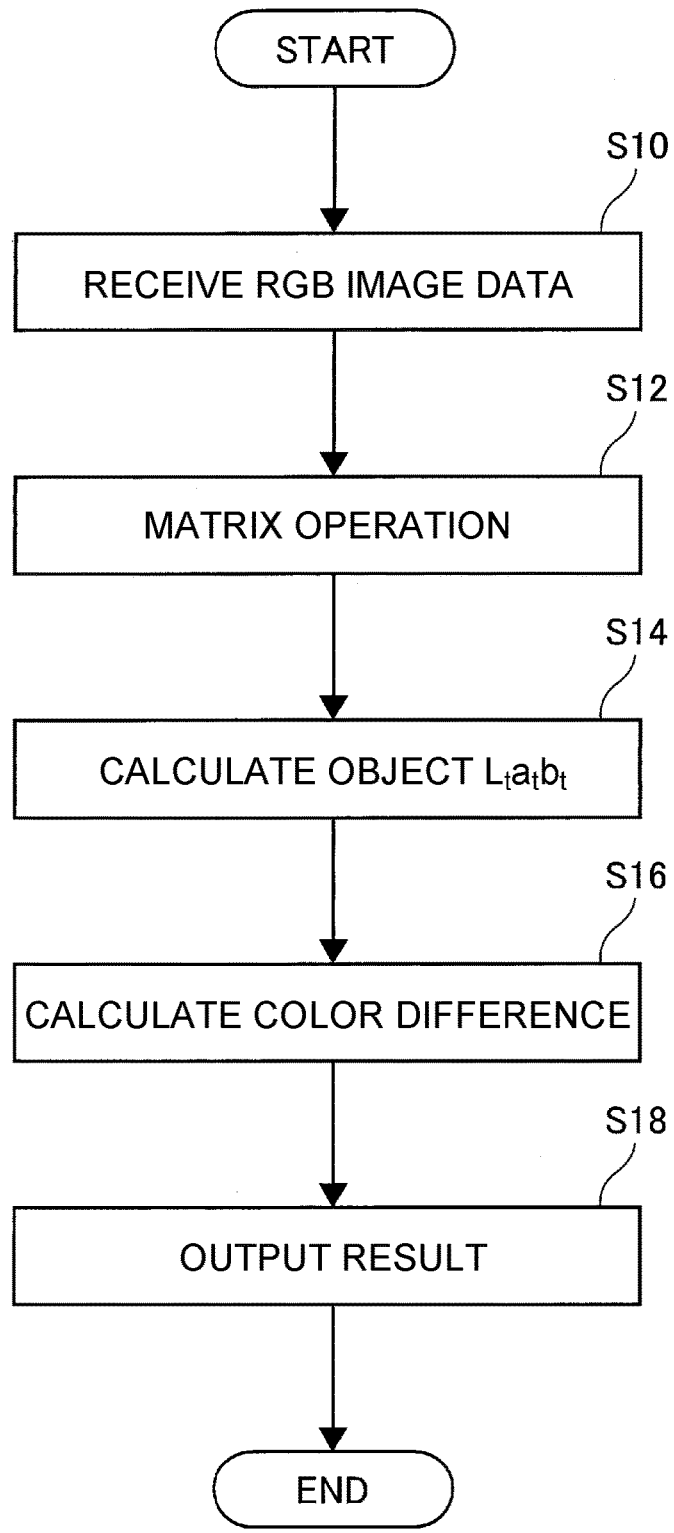
FIG. 4 is a flow chart illustrating a processing flow of the deterioration measuring device according to the exemplary embodiment of the present invention.

FIG. 4 is a flow chart illustrating a processing flow of the deterioration measuring device 20.

First, in step S10, RGB image data of the color samples 14 of the known color body 10 and the object 12 within the object capturing hole 16, which are obtained through capturing using the image capturing device 18, are received.

Meanwhile, the image data to be adopted include an average value of each of RGB in a region near the center within the color sample 14 having the same color.

In the following step S12, a matrix operation is performed. That is, the RGB image data of the color samples 14 received in step S10 are set as explanatory variables, and a colorimetric value Lab of each of the color samples 14 obtained through colorimetry in advance and stored in the memory 24 is set as an object variable to obtain a matrix through multiple regression.

For example, as expressed in Equation (1) below, a matrix in multiple regression is obtained, and image data RGB are converted into a colorimetric value Lab.

[Equation 1]

$$^t(L,a,b) = M^t(R,G,B,1) \quad (t: \text{TRANSPOSED MATRIX, M IS A } 3\times 10 \text{ MATRIX}) \quad (1)$$

Specifically, Equation (2) below is used.
[Equation 2]

$$L = (a11, a12, a13, \ldots, a110) \, ^t(R,G,B,R^2, G^2, B^2, RG, GB, BR, 1)$$

$$a = (a21, a22, a23, \ldots, a210)$$

$$b = (a31, a32, a33, \ldots, a310) \quad (2)$$

In the following step S14, RGB data of an image within the object capturing hole 16 of the known color body 10 captured by the image capturing device 18, that is, an image of the object 12 are put in the equation obtained in step S12 to obtain an expected colorimetric value $L_t a_t b_t$ of the object.

Meanwhile, in the exemplary embodiment, as expressed in Equation (1), multiple regression is performed by a quadratic equation, but may be performed by a color conversion method such as a three-dimensional table method used in a general color management system instead of the quadratic equation. Also, instead of the multiple regression, a neural network by learning may be used. That is, any method may be used as long as the method is capable of forming color conversion using teacher data (data of explanatory variables and object variables).

In the following step S16, a color difference ΔE between a colorimetric value $L_0 a_0 b_0$ on the object in a new product state and a colorimetric value $L_t a_t b_t$ obtained in step S14 is calculated. As the colorimetric value $L_0 a_0 b_0$ on the new product state, a value obtained through actual colorimetry in a new product state may be used, or a value of the color sample No. 142 of the known color body 10 may be used.

For the calculation of the color difference ΔE, for example, Equation (3) below is used.
[Equation 3]

$$\Delta E = \sqrt{(L_0 - L_t)^2 + (a_0 - a_t)^2 + (b_0 - b_t)^2} \quad (3)$$

Meanwhile, in the example, as expressed in Equation (2), the color difference ΔE is obtained by an Euclidean distance, but, for example, ΔE00 or the like may be used.

Then, in the following step S18, the measured result is output to the output device 34, and the process is ended. As the measured result, ΔE calculated in step S16 may be output as it is. Meanwhile, when ΔE exceeds a predetermined threshold, a message indicating that repairing is needed may be displayed, or a deterioration level, e.g., level 1, level 2, or the like may be output.

Meanwhile, in the exemplary embodiment, the deterioration measuring device 20 is configured as a personal computer, but the present invention is not limited thereto. For example, the image capturing device 18 may have all or some of functions of the deterioration measuring device 20.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A change degree deriving device comprising:
   a processor programmed to:
      receive an image obtained by capturing an object and a known color body including a plurality of color samples, the plurality of color samples including deterioration-series colors among colors used for the object, and each of the color samples having a known colorimetric value;
      generate a conversion rule used to convert a color of the image received by the receiving unit into a colorimetric value in a device-independent color space based on the color samples included in the image received by the receiving unit; and
      convert a color of the object included in the image received by the receiving unit into a colorimetric value in the device-independent color space according to the conversion rule.

2. The change degree deriving device according to claim 1, the processor being further programmed to:
   compare the color of the object converted by the converting unit with a reference color of the object.

3. The change degree deriving device according to claim 2, the processor being further programmed to:
   output a comparison result of the comparing unit.

4. A change degree deriving system comprising:

a processor programmed to:

obtain an image by capturing an object and a known color body including a plurality of color samples, the plurality of color samples including deterioration-series colors among colors used for the object, and each of the color samples having a known colorimetric value;

receive the image captured by the capturing unit;

generate a conversion rule used to convert a color of the image received by the receiving unit into a colorimetric value in a device-independent color space based on the color samples included in the image received by the receiving unit; and convert a color of the object included in the image received by the receiving unit into a colorimetric value in the device-independent color space according to the conversion rule.

* * * * *